E. T. UPRIGHT.
MEASURING DEVICE FOR SEMILIQUIDS.
APPLICATION FILED JULY 28, 1920.
1,393,856.
Patented Oct. 18, 1921.
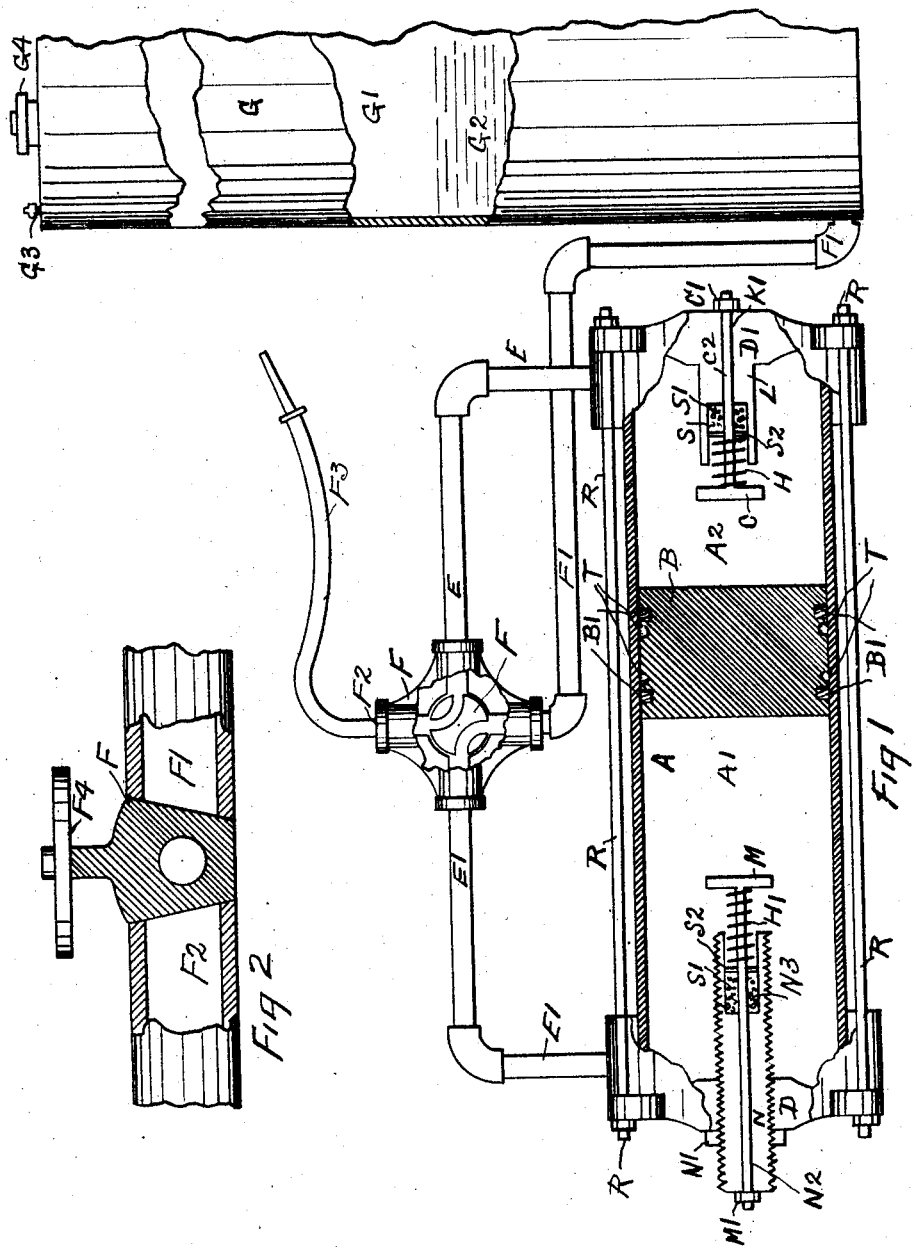

UNITED STATES PATENT OFFICE.

ERNEST T. UPRIGHT, OF FRESNO, CALIFORNIA, ASSIGNOR OF ONE-HALF TO ROBERT W. UPRIGHT.

MEASURING DEVICE FOR SEMILIQUIDS.

1,393,856.   Specification of Letters Patent.   Patented Oct. 18, 1921.

Application filed July 28, 1920. Serial No. 399,614.

*To all whom it may concern:*

Be it known that I, ERNEST T. UPRIGHT, a citizen of the United States, and resident of Fresno, in the county of Fresno and the State of California, have invented a new and useful Improvement in Measuring Devices for Semiliquids, of which the following is a specification.

My invention relates to a device for automatically rapidly and accurately measuring and delivering semi-liquids, including greases, oils, molasses, and similar substances.

It is commonly known that in measuring such substances as oil, grease and molasses, that much of such substances will adhere to the measure unless a long time is used in draining the measure. In my invention I overcome these objections. The objects of my invention are to accurately measure the substances named and to deliver the entire amount thus measured, to provide indicators which positively indicate the amount delivered, and to have such substances delivered through a discharge pipe so that the substance measured can be delivered into another receptacle, or directly into the oil or grease containers on an automobile or machine, thus permitting the handling of such substances in a cleanly manner.

I accomplish these and other objects hereinafter set forth by means of the device hereinafter described and illustrated on the accompanying drawing in which Figure 1 is a sectional view of the device complete. Fig. 2 is a sectional view of a modified arrangement of a four-way valve.

In said drawings A is a cylinder. F is a four-way valve. E and $E^1$ are leads from opposite ends of the cylinder to opposite sides of four-way valve F. G is a tank adapted to contain oils, grease, or substances desired to be measured. Tank G should be constructed air tight with a valve $G^3$ adapted to admit air and to hold it therein under pressure and a plug $G^4$ for placing the substance to be measured therein. The tank G is shown in the drawing to be partly filled with semi-liquid substance. $G^1$ is an air chamber within the tank above the heavier contents. $F^1$ is a lead from the lower portion of tank G, preferably from the bottom, to the four-way valve F. $F^2$ is an outlet from the four-way valve F showing a flexible pipe $F^3$. B is a piston fitted in cylinder A having compression rings $B^1$ for the purpose of having it fit snugly within the cylinder and oil ducts T encircling the piston. In construction of the device the rings and the ducts may be dispensed with if the piston fits tight enough in the cylinder. The piston B forms a partition within the cylinder A which divides the cylinder into two compartments, $A^1$ and $A^2$. D and $D^1$ are cylinder heads attached to cylinder A by means of tie rods R. Cylinder head $D^1$ is constructed with a cup shaped projection L extending inwardly within the tube, and having a hole $K^1$ therethrough approximately in line with the center line of cylinder A. The bottom of cup L is formed for a stuffing box S having rings of felt $S^1$ therein and a washer $S^2$ on the outside face of the felt. $C^2$ is a plunger stem fitted to slide in hole $K^2$, having on the end inside the cylinder a head C. $C^1$ is a nut or stop on the end of stem $C^2$ opposite head C. H is a compression spring placed between head C and the washer $S^2$. The object of this portion of the device is to indicate on the outside end of the cylinder when the piston B is at the end of its travel in that end of the cylinder, as it will force head C against cup L and push the plunger stem $C^2$ outwardly. Cylinder head D has a threaded hole $N^2$ therethrough adapted to receive calibrating screw or adjusting stop N, the lateral center line of which is in common with the center line of cylinder A and having a hole $N^2$ therethrough. $M^2$ is a plunger stem fitted to slide in the hole $N^2$. Plunger stem $M^2$ has a head M on the end inside the cylinder and a nut or stop $M^1$ at the other end. The hole $N^2$ is enlarged at the inside end of stop N, forming a stuffing box $N^3$ which contains felt rings $S^1$ and a washer $S^2$, which forms a seat for compression spring $H^1$. Spring $H^1$ is normally adapted to hold the head M a spaced distance from the end of adjusting stop N. The object of the head M, stem $M^2$ and spring $H^1$ is to indicate when piston B is at the end of its travel at the end of the cylinder adjacent to head M. The adjusting stop N is threaded and screws into the end of the cylinder for the purpose of limiting the movement of piston B. $N^1$ is a lock nut adapted to lock adjusting screw N to the cylinder head D. Four-way valve F is arranged to connect pipes $F^1$ and E, and pipes $E^1$ and $F^2$, or, to connect pipes $F^1$ and $E^1$, and E and $F^2$. It will be noted that by placing compressed air in chamber $G^1$, the grease or other fluid or semi-fluid substance will be forced through pipe $F^1$ through four-way valve F into pipe E and into chamber $A^1$ until the piston B is moved against head M which is forced against the end of tube N, thus filling chamber $A^1$ with the contents of tank G. Then by reversing the valve F so that the pipe $F^1$ is connected with pipe $E^1$, and pipe E is connected with pipe $F^2$, the chamber $A^2$ will be filled with the contents of the tank G and the piston B will be forced back to the stop C, forcing the contents of the chamber through outlet opening $F^2$ through the pipe $F^3$ into any desired container or place.

The cylinder A should have a uniform diameter. It will be noted that after the device is filled with the substance being measured, the cubical contents of the cylinder A for the length of travel of piston B will always be the cubical contents of the grease or other substance discharged in each alternating movement of the piston, and such amount can be regulated by the calibrating screw or adjusting stop N, thus giving accurate and rapid measurement of the substances being measured by the pressure of the air, and movement of the piston.

Having described my invention I claim as new and ask for Letters Patent:

1. In a measuring device the combination of a cylinder, having closed ends, a movable piston therein, a four-way valve, a lead from each end of the cylinder to said four-way valve, an air tight tank, means for injecting compressed air into the tank, a lead from the inside of the tank near the bottom thereof to said four-way valve, an outlet from said four-way valve, said parts being arranged so that the lead from the tank can be connected with either lead from the cylinder, and the outlet will at all times be connected with the lead from the cylinder not connected with the lead from the tank, means adapted to limit the lateral movement of the piston, a plunger stem extending through each end wall of the cylinder adapted to be pushed outwardly when the piston is at the end of its travel in either direction, substantially as described.

2. In a measuring device the combination of a cylinder, having closed ends, a movable piston therein, a four-way valve, a lead from each end of the cylinder to said four-way valve, an air tight tank, means for injecting compressed air into the tank; a lead from the inside of the tank near the bottom thereof to said four-way valve, an outlet from said four-way valve said parts being arranged so that the lead from the tank can be connected with either lead from the cylinder, and the outlet will at all times be connected with the lead from the cylinder not connected with the lead from the tank, means adapted to limit the lateral movement of the piston, a plunger stem extending through each end wall of the cylinder adapted to be pushed outwardly when the piston is at the end of its travel in either direction, and spring means for normally holding the plunger in a position intercepting the piston in its line of travel substantially as described.

ERNEST T. UPRIGHT.

Witnesses:
ERNEST KLETLE,
H. A. HUEBNER.